United States Patent
Fukushima et al.

(10) Patent No.: US 6,903,746 B2
(45) Date of Patent: Jun. 7, 2005

(54) RENDERING PROCESSING METHOD

(75) Inventors: Takashi Fukushima, Saitama (JP); Kentaro Motomura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 63 days.

(21) Appl. No.: 10/179,908

(22) Filed: Jun. 24, 2002

(65) Prior Publication Data
US 2003/0025710 A1 Feb. 6, 2003

(30) Foreign Application Priority Data
Aug. 3, 2001 (JP) ........................................ 2001-236567

(51) Int. Cl.⁷ ................................................ G09G 5/02
(52) U.S. Cl. ..................... 345/582; 345/582; 345/587; 345/426
(58) Field of Search ............................... 345/582–605, 345/473–475, 426

(56) References Cited

U.S. PATENT DOCUMENTS

| | | | | |
|---|---|---|---|---|
| 5,696,892 A | * | 12/1997 | Redmann et al. | 345/582 |
| 5,740,343 A | * | 4/1998 | Tarolli et al. | 345/587 |
| 5,966,134 A | * | 10/1999 | Arias | 345/589 |
| 6,639,595 B1 | * | 10/2003 | Drebin et al. | 345/426 |
| 2001/0020947 A1 | * | 9/2001 | Kurihara | 345/583 |
| 2001/0022586 A1 | * | 9/2001 | Hino et al. | 345/473 |
| 2001/0024206 A1 | * | 9/2001 | Kobayashi | 345/582 |
| 2001/0045955 A1 | * | 11/2001 | Oka | 345/582 |
| 2003/0206176 A1 | * | 11/2003 | Ritter | 345/582 |

FOREIGN PATENT DOCUMENTS

| | | | | |
|---|---|---|---|---|
| JP | 2000-136674 | * | 5/2000 | ........... G06T/15/50 |
| JP | 2001-319244 | | 11/2001 | |

OTHER PUBLICATIONS

Woo, Poulin, Fournier; "A Survey of Shadow Algorithms," IEEE Computer Graphics & Applications, Nov. 1990, pp 13–32.*

Oudshoorn, Juri A.; "Ray Tracing As The Future of Computer Games," Department of Computer Science, University of Utrecht, Nov. 1999, pp 1–50.*

* cited by examiner

Primary Examiner—Matthew C. Bella
Assistant Examiner—Alysa Brautigam
(74) Attorney, Agent, or Firm—Katten Muchin Zavis Rosenman

(57) ABSTRACT

A first texture is used for determining color and design of a polygon structuring an object rendered upon a two-dimensional screen. A second texture has a pattern of dense distribution of color with a predetermined slant relative to the two-dimensional screen. An rendering processing device first applies a first texture to a polygon structuring an object, and thereafter performs translucent synthesis of a second texture on an object applied with the first texture, thereby making it possible to easily render an image in a hand-drawn illustration style in, for example, home video games and computer graphics.

19 Claims, 6 Drawing Sheets

RENDERING PROCESSING METHOD

This application is related to Japanese Patent Application No. 2001-236567 filed on Aug. 3, 2001, based on which this application claims priority under the Paris Convention and the contents of which are incorporated herein by reference.

BACKGROUND OF THE INVENTION

1. Field of the Invention

The present invention relates to a rendering processing method and apparatus, which render, for example, three-dimensional image information upon a two-dimensional screen such as a television monitor, a recording medium having recorded therein a rendering processing program, and the rendering processing program.

2. Description of the Related Art

In recent years, video game units and personal computers continue to see advances in, for example, high degree of integration and high speed of processors, memory, and the like. Accordingly, a rendering processing device configured with such game console units and personal computers produces finer, high-definition two-dimensional images which are rich with diversity and which appear more life-like and give a higher sense of realism from three-dimensional image information, and is capable of rendering these images upon a two-dimensional screen.

Meanwhile, a video game user, for example, desires not only games having life-like images, but also games using images in styles such as handwritten cel animation. Images in the cel animation style mentioned above are generally produced through the use of a rendering process called cartoon shading (or cel shading).

On the other hand, most recently, images in a hand-drawn style giving an even more interesting flavor than cel animation-styled images have been desired. Nevertheless, conventional cartoon shading processes can produce images close to hand-drawn cel images, but expression of flavorful and hand-drawn illustration styled images is difficult.

SUMMARY OF THE INVENTION

The present invention has come about in consideration of such issues, and the objective thereof lies in providing a rendering processing method and apparatus, a recording medium having recorded therein a rendering processing program, and the rendering processing program, all of which allow eased production of images in a hand-drawn illustration style in, for example, a home video game or computer graphics.

The present invention, applies a first texture that determines the color or design of a polygon structuring an object to be rendered upon a two-dimensional screen, and applies a second texture having a pattern of dense distribution of color with a predetermined slant relative to the coordinates of the two-dimensional screen to that object through translucent synthesis.

More specifically, by merely performing translucent synthesis and application of a second texture on an object applied with a first texture, it is possible to easily produce an image in a hand-drawn illustration style.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Figure 1:
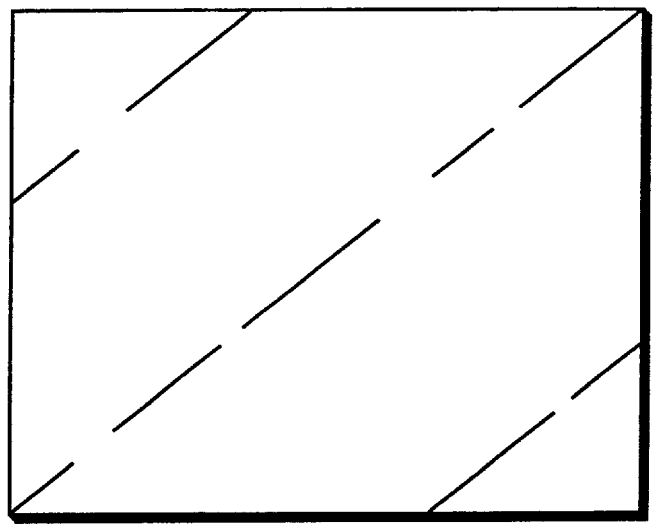
FIG. 1 is a diagram showing an example of an oblique line texture used when performing hand-drawn illustration style image rendering.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

A rendering processing device according to an embodiment of the present invention, together with performing image rendering in the cel animation style that is based on cartoon shading, renders oblique lines for the individual main structural components to be rendered upon a two-dimensional screen. The rendering processing device is capable of expressing portions where light hits and portions in the shadows by adjusting the depth of oblique lines corresponding to the manner in which light hits each object upon the screen, and further expressing an illustration image in the hand-drawn style through rendering a border around the outline portion of each object.

The following embodiment is described using the example of video game images.

Figure 2:
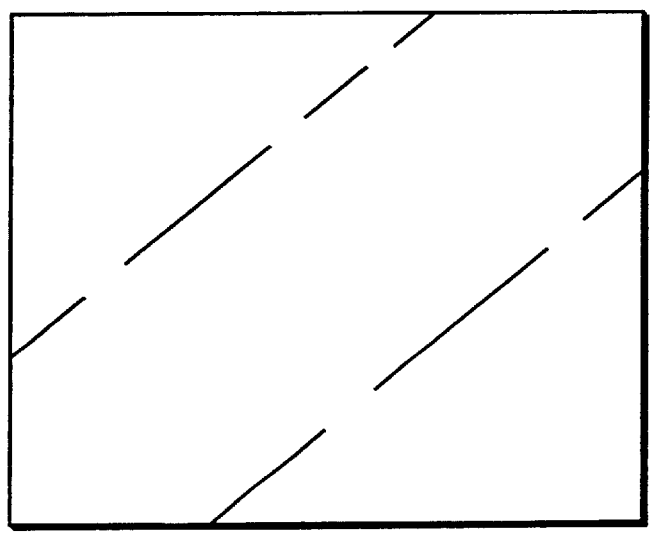
FIG. 2 is a diagram showing an example of another oblique line texture used together with the oblique line texture of FIG. 1 when performing hand-drawn illustration style image rendering.

The rendering processing device of this embodiment is made capable of implementing illustration style rendering through application of a texture (hereafter referred to as oblique line texture) wherein a color tint pattern is arranged at a slant, for example as shown in FIG. 1 and FIG. 2, relative to the XY coordinates on a two-dimensional screen for all of the main structural elements, or the background, game characters, and the like that form the game screen. In particular, the rendering processing device according to this embodiment implements rendering closer to illustrated images by dividing a game character into parts (objects of each part structuring a game character) such as the entire body, head, arms, and legs, and applying oblique line texture individually to every one of those parts. In the case where oblique line texture is applied to each part as described above, the rendering processing device of this embodiment first calculates the oblique line synchronizing point of each part (center coordinates of the head, arms, legs, hands, etc.) and calculates the respective reference point by subjecting the oblique line synchronizing point of every one of these parts to perspective transformation. Then the rendering processing device of this embodiment matches this reference point with the center point of the oblique line texture to apply this oblique line texture onto the already rendered parts.

Here, it is desirable that the oblique line texture in FIG. 1 and FIG. 2 is that which has, for example, the oblique line portion randomly arranged, and that each line has random lengths (namely, like hand-drawn oblique lines). By using such oblique line texture, the rendering processing device of this embodiment is able to implement hand-drawn illustration style rendering. In addition, the oblique line texture in FIG. 1 and FIG. 2 is situated so that the arranged positions of the respective oblique line portions are not aligned relative to each other. When the oblique line texture is applied for each part, the rendering processing device of this embodiment is able to represent movement (in other words, an "active feel") by, for example, switching the oblique line textures of FIG. 1 and FIG. 2 back and forth with each other at intervals of approximately one second. Moreover, the rendering processing device of this embodiment sets the oblique line movement in each part to be varied, or in other words, sets the timing of the switching between the two oblique line textures and the switching cycle therebetween to be at random for every one of the parts. This allows the obtained image to be an image having a "soft illustration touch" unlike the already existing computer graphics style or animation style, without causing interference among the oblique lines of characters when, for example, two characters appear on the same screen. Note that these oblique line textures to be switched are not limited to being the two oblique line textures shown in FIG. 1 and FIG. 2, but may be any number of textures equal to or greater than this. Furthermore, it is not necessary for the timing of the switching to be fixed, but may also be a variable length of time.

In addition, the rendering processing device of this embodiment performs ray tracing (calculation of illumination), and calculates the intensity of light that hits for every pixel. The rendering processing device then sets the subtraction value in response to the light intensity for every one of those pixels. The subtraction value here is set so that the value is low for a pixel having high light intensity and the value is high for a pixel having low light intensity. Basically, the rendering device sets the above-mentioned subtraction value so that the amount to be subtracted becomes larger when the color of the above-mentioned oblique line texture is subtracted from the color of the portion of the parts to become shadow. Then when this oblique line texture is to be applied to each of the parts, the rendering processing device of this embodiment references the subtraction value set for every one of the pixels of each of these parts and subtracts the above-mentioned color of this oblique line texture from the color of the earlier rendered parts. Through such subtraction/translucent processing, the shadow portion of each part of the game character darkens and the oblique lines of the oblique line texture becomes deeply noticeable. Meanwhile, the portion of each body part that the light hits becomes lighter and the oblique lines of the oblique line texture becomes lighter.

Moreover, the rendering processing device of this embodiment locates by calculation the outline of each of the parts comprising the game character and the border of every one of those parts can be represented by rendering that outline with, for example, a black line. In other words, the rendering processing device is able to clearly represent the boundary (outline) of the torso of the body and the arms even in circumstances where the body and arms, which are all the same color, overlap by showing the border of each of these parts.

Figure 3:
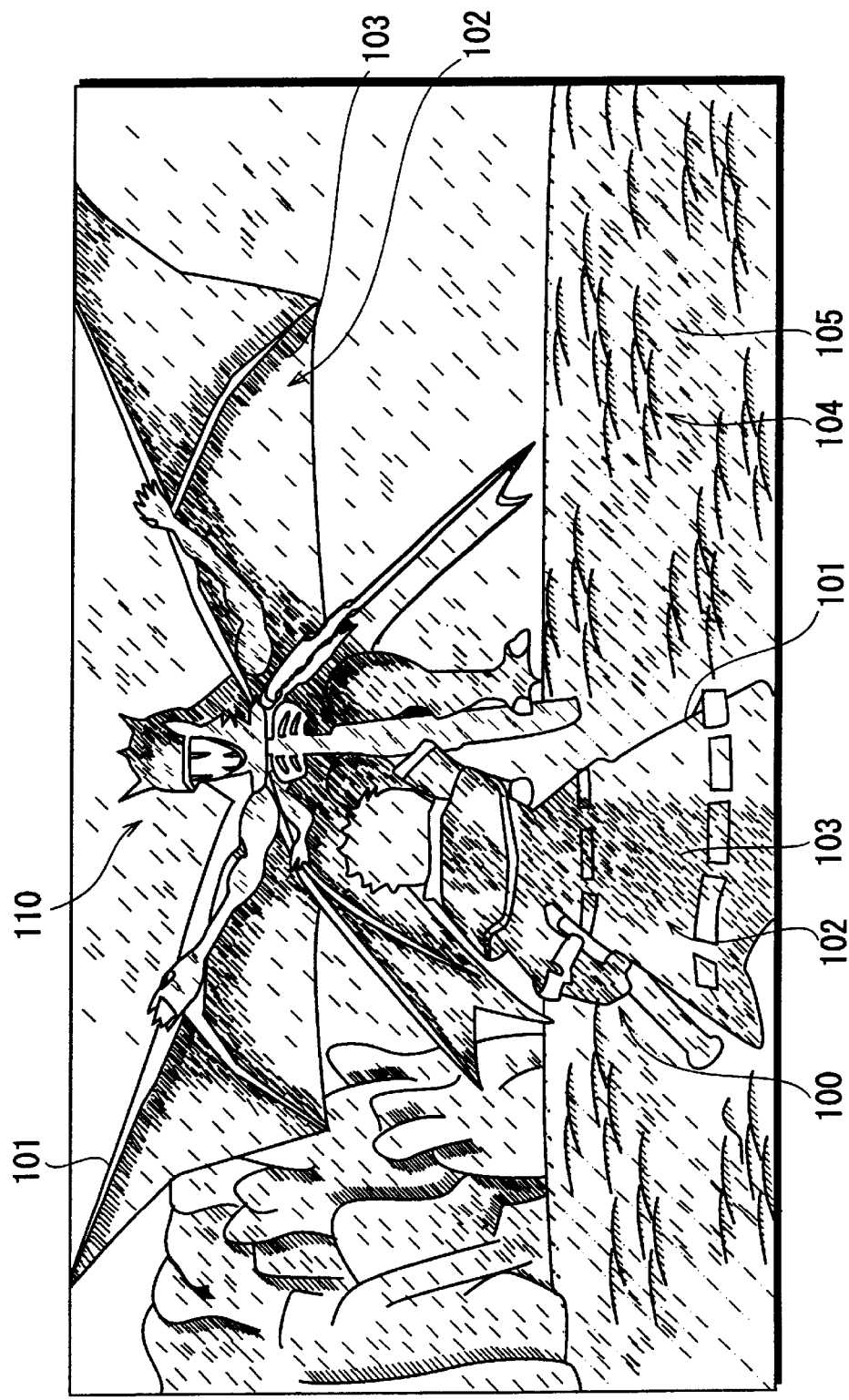
FIG. 3 is a diagram showing an example of an illustrated image.

This allows the rendering processing device to clearly render, as shown in FIG. 3, the respective outlines 101 of the characters 100, 110, as well as make the intense oblique lines 103 in the shadow portions 102 of the characters 100, 110 prominent, while the rendering processing device renders the portion 104 where light hits with a hand-drawn illustration style image drawn with light oblique lines 105. In addition, with the rendering processing device of this embodiment, an image having a soft illustration touch becomes possible by giving each of the oblique lines a feeling of movement through the switching back and forth between oblique line textures applied to each part at intervals of, for example, approximately one second as described above.

CONFIGURATION EXAMPLE

Figure 4:
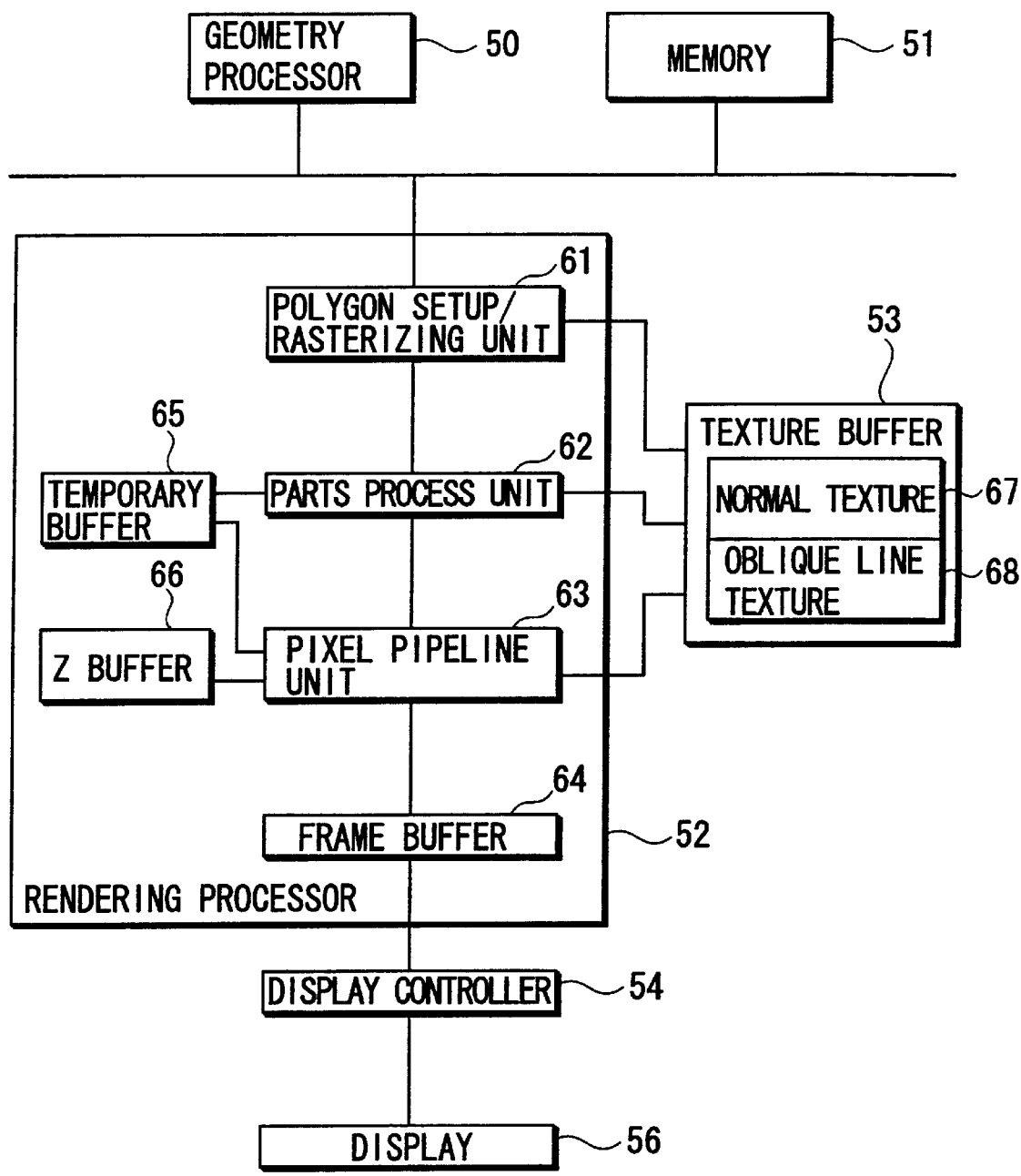
FIG. 4 is a block diagram showing a schematic configuration of implementing a rendering processing according to an embodiment of the present invention.

FIG. 4 shows a specific configuration of an rendering processing device, which performs subtracting translucent processing of the oblique line texture described above. Note that the configuration shown in FIG. 4 is an example of the case where the rendering processing device of the present invention is implemented using hardware such as a digital signal processor (DSP) or a graphics processor (GP). Each of the structural elements of FIG. 4 corresponds to the respective internal processing units of such a DSP or GP. In addition, in the following description, only the portions that are characteristic to the present invention are particularly highlighted.

In FIG. 4, the memory 51 is stored with the graphics information (node information or node connection information such as node coordinate values, RGB node color values, map coordinate values, and vector values) of a polygon, etc. Note that the graphics information is pre-imported from various recording media such as a CD-ROM, DVD-ROM, or semiconductor memory, or via wired or wireless telecommunication media or transmission media.

The geometry processor 50 reads out the above-mentioned graphics information stored in the above-mentioned memory 51, and performs affine transformation, projection transformation to screen coordinates, and geometry calculation such as ray tracing for the nodes. The above-mentioned post-projection transformation graphics information (polygon data) is sent to the rendering processor 52.

The rendering processor 52 is the portion that performs arithmetic processing for rendering a polygon upon the screen, and forms the polygon data sent from the above-mentioned geometry processor 50 into pixels. This rendering processor 52 is generally divided into a polygon setup/ rasterizing unit (hereafter represented as the PSR unit 61), a parts processing unit 62, a pixel pipeline unit 63, a frame buffer 64, a temporary buffer 65, and a Z buffer 66, the latter two to be described later. Note that the Z value, which represents the distance from the viewing point in the direction of the depth of the image, is stored in the Z buffer 66. In addition, the temporary buffer 65, which is described in more detail later, temporarily stores each pixel color of each part that has been already rendered, and the subtraction value for the subtracting translucent processing, which subtracts the color of the oblique line texture from the color of each part.

In addition, a texture buffer 53 is deployed conjunction with this rendering processor 52. The texture buffer 53 stores the three primary colors R (red), G (green), and B (blue) and an alpha value (A), which are for determining the texel color of the texture, or more specifically, the pixel color of the polygon. In the case of this embodiment, this texture buffer 53 stores a normal texture 67 for determining the color, pattern, etc. of each part of a character, and an oblique line texture 68 to be applied to each part of this character. The normal texture 67 and oblique line texture 68 stored in the texture buffer 53, and the Z value stored in the previously-mentioned Z buffer 66 are pre-imported from, for example, various storage media such as a CD-ROM, DVD-ROM, or semiconductor memory, or via wired or wireless telecommunication media or transmission media.

The above-mentioned PSR unit 61 comprises configuration called a digital differential analyzer (DDA) for performing linear interpolation calculation, and performs import and buffering of polygon data sent from the above-mentioned geometry processor 50 as well as pixelization through rasterizing and calculation of the texel coordinate values. The PSR unit 61 then sends this pixel data, texel coordinate values, and light source information to the pixel pipeline unit 63 via the parts process unit, and also sends the texture UV coordinate values (the address for referencing a texel) corresponding to the above-mentioned texel coordinate values to the texture buffer 53.

Here, the parts process unit 62 classifies pixel data and texel coordinate values supplied from the above-mentioned PSR unit 61 for every part of the character, and performs perspective transformation for each of these parts. The pixel pipeline unit 63 at this point determines pixel color for the polygons of each of the above-mentioned parts by referencing the texture color from the normal texture 67 within the texture buffer 53 in response to the texel referencing address. The pixel color determined by this pixel pipeline unit 63 is temporarily stored in a temporary buffer 65.

In addition, parts process unit 62 uses the light source information supplied from the rendering processor 52 via the PSR unit 61 to calculate by pixel the intensity with which light hits each individual pixel, and further calculates the subtraction value to be used for the subtracting translucent processing described above for every pixel of each part and stores it in the temporary buffer 65. At the same time, the parts process unit 62 calculates the reference point in conformity with the perspective projection of the oblique line synchronizing point of each one of the parts (the center point of head, hand, etc.), and sends the coordinate values of that reference point to the pixel pipeline unit 63.

Next, the pixel pipeline unit 63 reads out from the temporary buffer 65 the pixel color and the subtraction value of each part that has already been rendered, and at the same time reads out from the texture buffer 53 each texel color of the oblique line texture 68. The pixel pipeline unit 63 then matches the reference point and center point of the oblique line texture, and in response to the subtraction value performs the subtracting translucent processing by subtracting the texel color of the oblique line texture from the pixel color of the part in question. Note that here the pixel pipeline unit 63 is made so that it switches back and forth every fixed length of time (for example, every second) between two oblique line textures where the arranged positions of the respective hatching portions are not aligned with each other as shown in FIG. 1 and FIG. 2, which were described earlier. The pixel color of each of the parts after the subtracting translucent processing of this oblique line texture is again stored in the temporary buffer 65.

Next, the pixel color of each of the parts after the subtracting translucent processing of the oblique line texture is read out from the temporary buffer 65 and sent to the pixel pipeline unit 63. The pixel pipeline unit 63 then, after giving a border for each of the parts, draws each pixel data of each of these parts into frame buffer 64. Note that at this point, each of the parts is drawn upon the frame buffer 64 with the XY coordinate values of every border (of every part) offset.

The frame buffer 64 comprises memory space corresponding to a display (screen) 56 of a television monitor, and in that memory space are written the color values, etc. for each pixel structuring, for example, each of the parts of the character or the background. The screen data to be formed as a frame from this frame buffer 64 are thereafter read out as needed by a display controller 54.

The display controller 54 produces the horizontally synchronized signal and vertically synchronized signal for the television monitor, and in addition, linearly dispenses in order the pixel data from the frame buffer 64 in accordance with the display timing of that monitor. The two-dimensional image comprising these linear, sequentially given color values is displayed upon a display 56 such as a television monitor.

ALTERNATIVE EXAMPLE

The rendering process of this embodiment can be implemented not only in conformity with a hardware configuration such as shown in FIG. 4 above, but may naturally be implemented through software (i.e. an application program for a computer, etc.).

Figure 5:
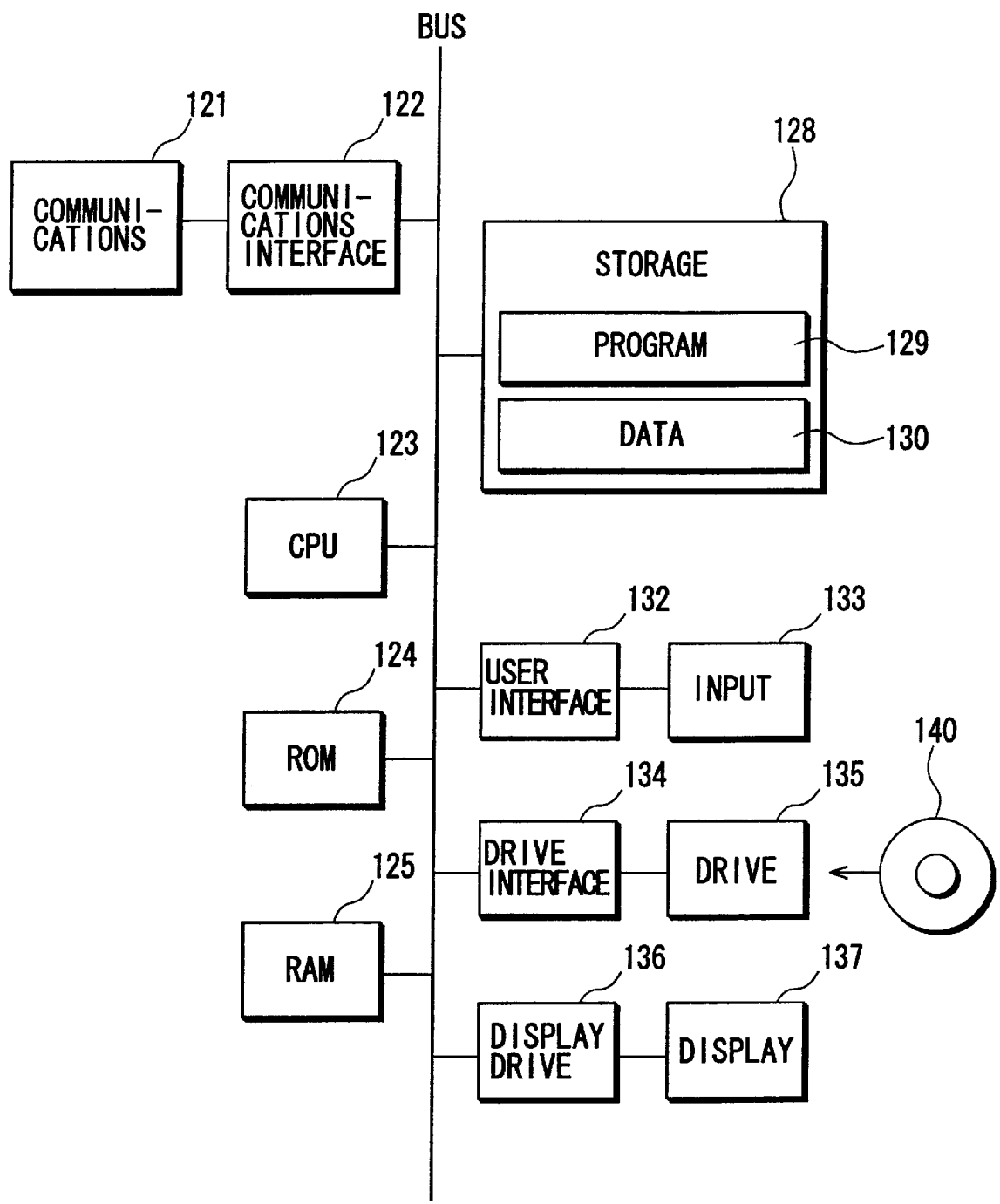
FIG. 5 is a block diagram showing a schematic configuration of a computer that implements the rendering processing according to the embodiment of the present invention.
Figure 6:
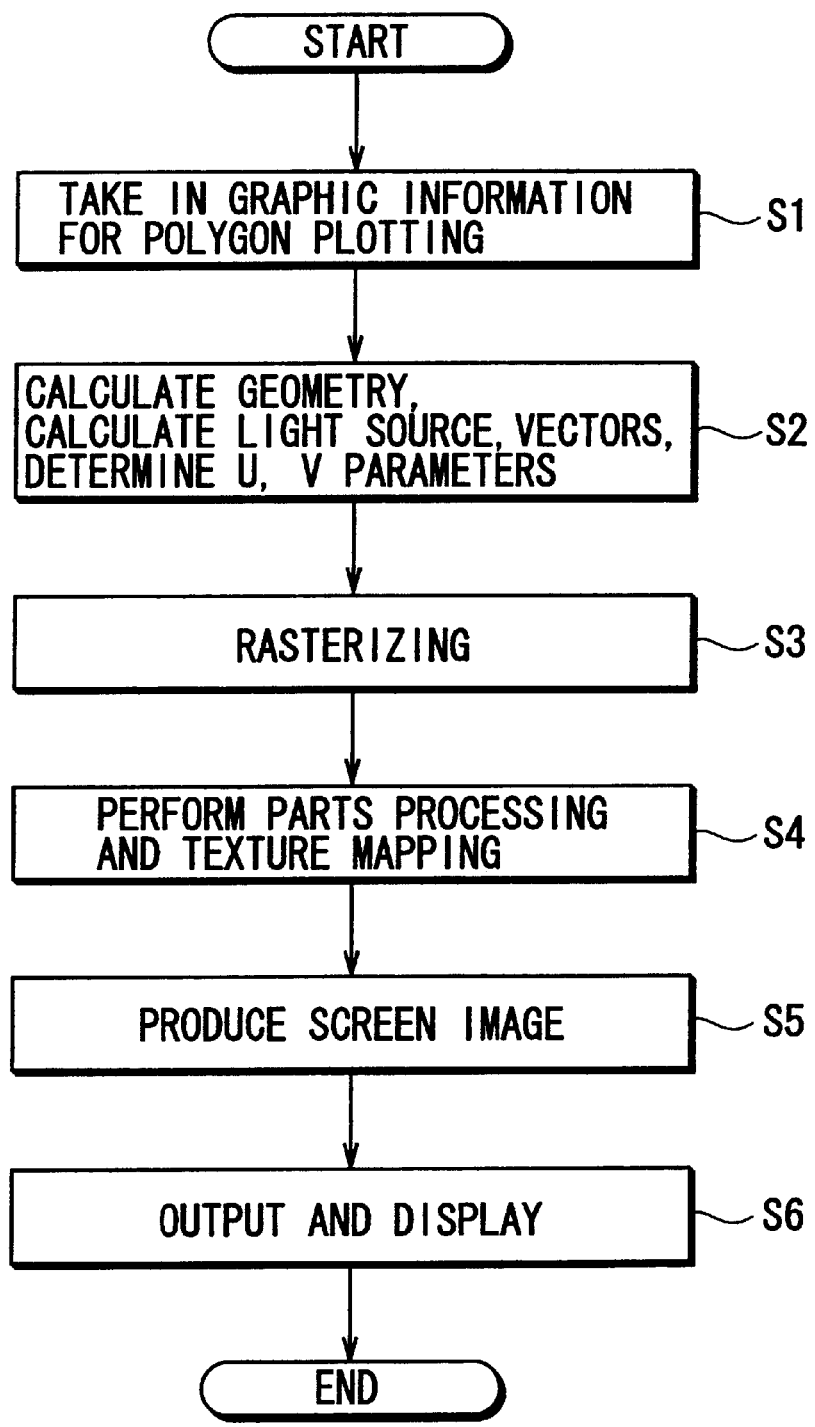
FIG. 6 is a flowchart of processing in the case where the rendering processing according to the embodiment of the present invention is implemented.
Figure 7:
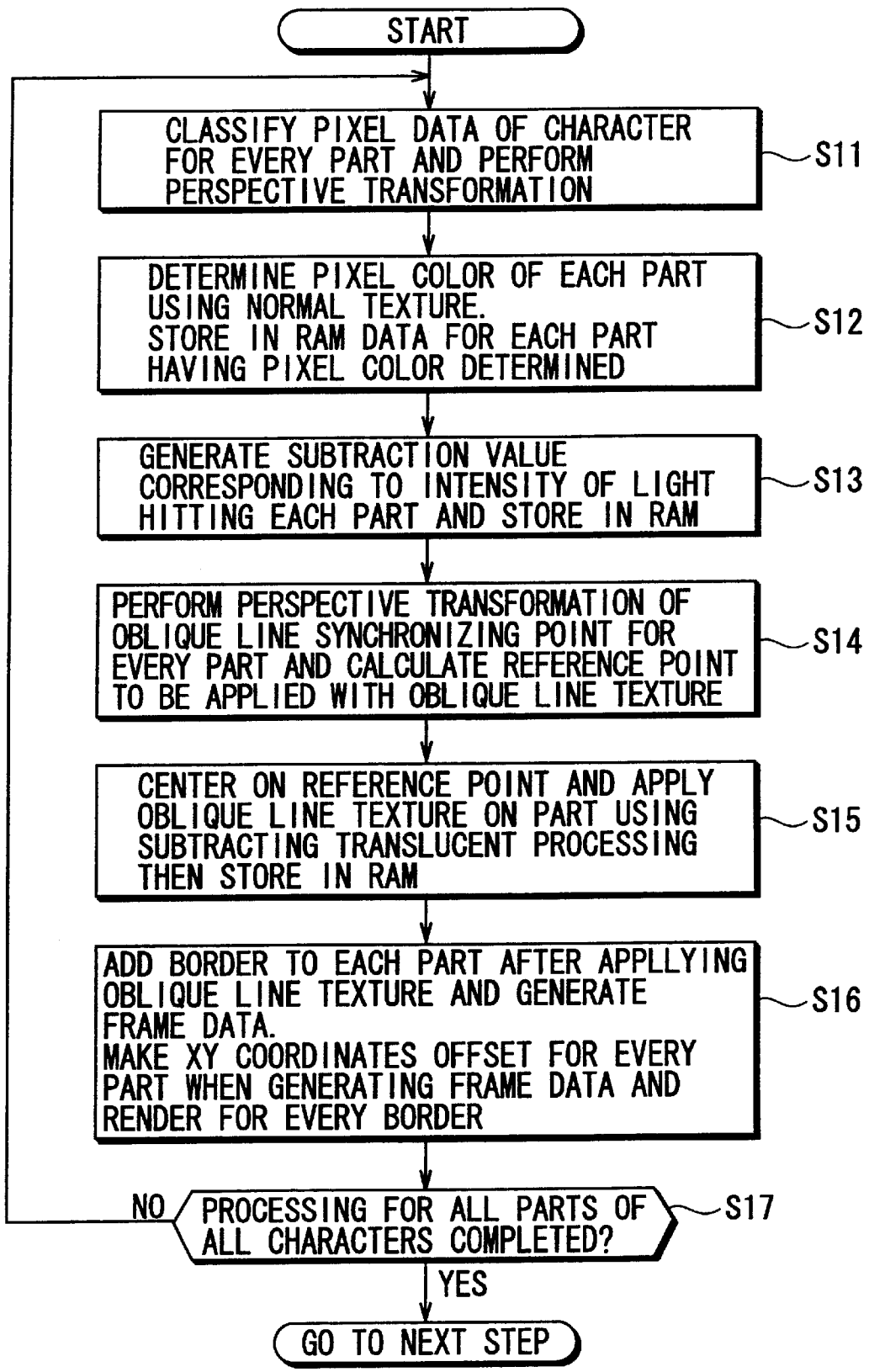
FIG. 7 is a flowchart showing the details of the processing in Step 4 of the flowchart in FIG. 6.

FIG. 5 through FIG. 7 show a configuration and operation in the case of implementing rendering processing of the present invention in a computer. FIG. 5 shows a structural example of the main elements of a computer. FIG. 6 shows the general process flow in the case where the CPU 123 of the computer of FIG. 5 executes a rendering processing program of the present invention. FIG. 7 the detailed process flow of the processing in step S4 in FIG. 6.

In FIG. 5, a storage unit 128 comprises, for example, a hard disk or a drive thereof. This storage unit 128 is stored with an operating system program, a computer program 129, which includes the rendering processing program of this embodiment that is imported from or any variety of storage media such as CD-ROM, DVD-ROM, etc., or via a telecommunication line, and the various data 130 to be used for polygon plotting, such as graphical information, the RGBA value of the texture, Z value, and the oblique line texture to be applied to every one of the parts.

The communications unit 121 is a communications device for performing external data communications, such as a modem for connecting to an analog public telephone line, a cable modem for connecting to a cable television network, a terminal adapter for connecting to an integrated services digital network (ISDN), or a modem for connecting to an asymmetric digital subscriber line (ADSL). The communications interface unit 122 is an interface device for performing protocol conversion to allow the exchange of data between the communications unit 121 and an internal bus (BUS).

The input unit 133 is an input device such as a keyboard, mouse, or touch pad. The user interface unit 132 is an interface device for providing a signal from the input unit 133.

The drive unit 135 is a drive device capable of reading out various programs or data from, for example, disc media 140 such as a CD-ROM or DVD-ROM or card-shaped semiconductor memory. The drive interface unit 134 is an interface device for providing a signal from the drive unit 135.

The display unit 137 is a display device such as a cathode ray tube (CRT) or liquid crystal display device. The display drive unit 136 is a drive device, which drives the display unit 137.

The CPU 123 provides general control of the personal computer based upon an operating system program or a computer program 129 of the present invention stored in the storage unit 128.

The ROM 124 comprises, for example, rewritable and nonvolatile memory such as flash memory and is stored with the basic input/output system (BIOS) and various initial settings of this computer. The RAM 125 is loaded with application programs and various data readout from the hard disk of the storage unit 128, and in addition, is used as the working RAM of the CPU 123, the texture buffer, temporary buffer, Z buffer, and frame buffer.

With the structure shown in FIG. 5, the CPU 123 realizes the rendering process of the earlier described embodiment through the execution of the computer program of this embodiment, which is one of the application programs read out from the hard disk of the above-mentioned storage unit 128 and loaded in RAM 125.

General Flow of the Rendering Program

Next, the process flow when the CPU 123 of the computer shown in FIG. 5 operates based on the application program of this embodiment used for rendering (rendering processing program), and is described forthwith using FIG. 6 and FIG. 7.

In FIG. 6, the CPU 123, as the processing of Step S1, reads out from the storage unit 128 graphics information, the RGBA value of the texture, the Z value, and the oblique line texture, which have been read out in advance from the disk media 140 and accumulated as data 130 in the storage unit 128 and are to be used for polygon plotting, holding them in RAM 125.

Next, the CPU 123, as the processing of Step S2, reads out the graphics information held in RAM 125, which is then subjected to affine transformation, projection transformation to screen coordinates, geometry calculation such as ray tracing for the nodes, and perspective transformation.

Next, the CPU 123, as the processing of Step S3, performs rasterizing using the polygon data obtained through the geometry calculation, and further, as the processing of Step S4, performs classification of the parts of the character, performs coloring to each part using the normal texture (texture mapping), and performs subtracting translucent processing in response to the application of oblique line texture to every one of the parts and how the light hits. The details of the processing involved in this Step S4 are described forthwith with FIG. 7.

Thereafter, the CPU 123, as the processing of Step S5, produces a screen image from the post-Step 4 processing pixel data, and further, as the processing of Step S6, sends this screen image information to the display drive 136. This allows an image to be displayed upon the display unit 137.

Details of Step S4

In the following, the detailed process flow of the processing in Step 4 of FIG. 6 is described using FIG. 7.

In FIG. 7, as the CPU 123 proceeds to the processing of Step S4 of FIG. 6, as the processing of Step S11, the CPU 123 first classifies the pixel data and texel coordinate values produced in Step S3 of FIG. 6 for every part of a character, and further performs perspective transformation on every one of these parts.

Next, the CPU 123, as the processing of Step S12, determines the pixel color of each of the parts using the normal texture loaded into RAM 125. The CPU 123 then stores in RAM 125 the data of each of the parts for which this pixel color was determined.

Next, the CPU 123, as the processing of Step S13, calculates the intensity of light hitting each part by performing ray tracing, finds the subtraction value for each one of these parts from this light intensity, and stores it in RAM 125.

In addition, the CPU 123, as the processing of Step S14, calculates a reference point by subjecting the oblique line synchronizing point of each one of the parts to perspective transformation.

Next, the CPU 123, as the processing of Step S15, reads out the pixel color and the subtraction value for each of the parts stored earlier in the RAM 125, as well as the texel color for the oblique line texture. The CPU 123 then matches the reference point and center point of the oblique line texture, subtracts the texel color of the oblique line texture from the pixel color of each of the parts in response to the subtraction value, and thereafter returns it to RAM 125. Note that during this oblique line texture subtraction/translucent processing, the CPU 123 switches back and forth every fixed length of time (for example, every second), alternatingly applying two oblique line textures where the arranged positions of the respective oblique line portions are not aligned with each other as shown in the earlier described FIG. 1 and FIG. 2.

Next, the CPU 123, as the processing of Step S16, gives a border to every one of the parts after applying an oblique line texture, and structures frame data by rendering each of these parts attached a border. Note that when producing this frame data, the CPU 123 produces frame data where each part is arranged within a frame by offsetting the XY coordinate values.

Thereafter, the CPU 123, as the processing of Step S17, determines whether the rendering process for all of the parts of all of the characters arranged in a frame, as well as for other objects, background, etc. has been completed. When processing has not been completed, the processing of the CPU 123 returns to Step S11; otherwise, when completed, the processing proceeds to Step S5 in FIG. 6.

SYNOPSIS OF THE EMBODIMENTS OF THE PRESENT INVENTION

According to these embodiments, by displaying a border for each of the parts of a character, for example, even if parts having the same color overlap the boundary between parts can be clearly represented; in addition, illustration style rendering is made possible through the application of oblique line texture onto each part by performing subtracting translucent processing in response to the intensity of light hitting each of the parts. Moreover, according to these embodiments, rendering having a soft illustrated touch and a feel of movement is implemented through the application of two oblique line textures where the arranged positions of the respective oblique line portions are not aligned with each other, and switching back and forth between each other at a fixed time interval.

Note that the description of the above-mentioned embodiments is only an example of the present invention. Accordingly, the present invention is not limited to the embodiments described above, but may naturally include various modifications in design without departing from the technical spirit and scope of the invention. For example, the rendering process of this embodiment is not limited to being performed on a dedicated video game unit or personal computer, but may also be implemented in conformity with various information processing devices including mobile terminals. In addition, with this embodiment, an example giving color images was given, however the present invention is also applicable to monochrome images. Moreover, with this embodiment, an example of oblique line texture as the texture for allowing implementation of a hand-drawn illustration style; however, it is also allowable to use textures besides this. In addition, representation of movement (with an 'active feel') may be implemented by alternatingly moving the application coordinate positions of, for example the one oblique line texture shown in FIG. 1 at a fixed time interval, instead of switching back and forth between the two oblique line textures shown in FIG. 1 and FIG. 2.

As shown above, the present invention makes it possible to easily produce hand-drawn illustration style images, for example, in video games or computer graphics, through the application of a first texture, which determines the color or design of a polygon structuring an object to be rendered upon a two-dimensional screen, and application of a second texture having a dense distribution pattern of color with a predetermined slant relative to the coordinates of the two-dimensional screen to that object through a subtracting translucent processing.

What is claimed is:

1. A rendering processing method for rendering in projection upon a two-dimensional screen an object arranged upon a three-dimensional space, the object having at least one part and configured with at least one polygon, comprising the steps of:
   applying to the polygon structuring the object a first texture that determines color and design thereof; and
   performing translucent synthesis of a second texture having a dense distribution pattern of color with a predetermined slant relative to coordinates of the two-dimensional screen, onto an object comprising a polygon applied with the first texture.

2. The rendering processing method, according to claim 1, further comprising the steps of:
   calculating how light from a light source hits the object; and
   setting a per pixel subtraction value depending on how the light hits;
   wherein, when performing the translucent synthesis, a texel color value of the second texture is subtracted from a pixel color value of the object depending on the subtraction value.

3. The rendering processing method, according to claim 1, further comprising the steps of:
   calculating a reference point through perspective transformation of a center coordinate of the object; and
   positioning a center point of the second texture matched with the reference point.

4. The rendering processing method, according to claim 1, further comprising the steps of:
   classifying a plurality of parts for one or more objects; and
   applying the second texture to each classified part.

5. The rendering processing method, according to claim 1, wherein
   during the translucent synthesis, translucent synthesis is performed for a single object by switching back and forth at predetermined time intervals between at least two of the second textures where arrangement of a dense distribution pattern differs from each other.

6. The rendering processing method, according to claim 1, further comprising the steps of:
   calculating an outline of the object; and
   drawing a line segment along the outline as well as the object.

7. A rendering processing device, that renders in projection upon a two-dimensional screen an object arranged upon a three-dimensional space, the object having at least one part and configured with at least one polygon, comprising:
   a texture storage unit, that stores a first texture for determining color and design of a polygon structuring the object, and a second texture having a dense distribution pattern of color with a predetermined slant relative to coordinates of the two-dimensional screen;
   a texture application unit, that applies the first texture to the polygon structuring the object; and
   a synthesis unit, that performs translucent synthesis of the second texture to an object comprising a polygon applied with the first texture.

8. The rendering processing device, according to claim 7, further comprising:
   a ray tracing calculation unit, that calculates how light from a light source hits the object; and
   a subtraction value setting unit, that sets a per pixel subtraction value depending on how the light hits;
   wherein the synthesis unit subtracts a texel color value of the second texture from a pixel color value of the object depending on the subtraction value.

9. The rendering processing device, according to claim 7, further comprising:
   a reference point calculation unit, that calculates a reference point through perspective transformation for a center coordinate of the object; and
   a positioning unit, that positions a center point of the second texture matched with the reference point.

10. The rendering processing device, according to claim 7, further comprising:
    a classification unit, that classifies a plurality of parts for one or more objects; and
    an appropriation unit, that applies the second texture to each classified part.

11. The rendering processing device, according to claim 7, wherein
    the synthesis unit performs translucent synthesis for a single object, by switching back and forth at predetermined time intervals between at least two of the second textures where arrangement of a dense distribution pattern differs from each other.

12. The rendering processing device, according to claim 7, further comprising:
    an outline calculation unit, that calculates an outline of the object; and
    a drawing unit, that draws a line segment along the outline as well as the object.

13. A computer-readable recording media having recorded therein a rendering processing program to be executed on a computer for rendering in projection upon a two-dimensional screen an object arranged upon a three-dimensional space, the object having at least one part and configured with at least one polygon;
    the rendering processing program comprising:
    a step of applying to the polygon structuring the object a first texture that determines color and design thereof; and
    a step of performing translucent synthesis of a second texture having a dense distribution pattern of color with a predetermined slant relative to coordinates of the two-dimensional screen, onto an object comprising a polygon applied with the first texture.

14. The computer-readable recording media having recorded therein a rendering processing program according to claim 13, the rendering processing program further comprising:

a step of calculating how light from a light source hits the object; and a step of setting a per pixel subtraction value depending on how the light hits;

wherein the translucent synthesis performing step includes a step of subtracting a texel color value of the second texture from a pixel color value of the object depending on the subtraction value.

15. The computer-readable recording media having recorded therein a rendering processing program according to claim 13, the rendering processing program further comprising:

a step of calculating a reference point through perspective transformation of a center coordinate of the object; and a step of positioning a center point of the second texture aligned with the reference point.

16. The computer-readable recording media having recorded therein a rendering processing program according to claim 13, the rendering processing program further comprising:

a step of classifying a plurality of parts for one or more objects; and a step of applying the second texture to each classified part.

17. The computer-readable recording media having recorded therein a rendering processing program according to claim 13, wherein the translucent synthesis performing step includes a step of performing translucent synthesis for a single object, by switching back and forth at predetermined time intervals between at least two of the second textures where arrangement of a dense distribution pattern differs from each other.

18. The computer-readable recording media having recorded therein a rendering processing program according to claim 13, the rendering processing program further comprising:

a step of calculating an outline of the object; and a step of drawing a line segment along the outline as well as the object.

19. A computer-readable rendering processing program to be executed on a computer for rendering in projection upon a two-dimensional screen an object arranged upon a three-dimensional space and configured with at least one polygon, comprising:

a step of applying to the polygon structuring the object a first texture that determines color and design thereof; and a step of performing translucent synthesis of a second texture having a dense distribution pattern of color with a predetermined slant relative to coordinates of the two-dimensional screen, onto an object comprising a polygon applied with the first texture.

* * * * *